United States Patent
Tabakovic et al.

(10) Patent No.: US 6,778,357 B2
(45) Date of Patent: Aug. 17, 2004

(54) ELECTRODEPOSITED HIGH-MAGNETIC-MOMENT MATERIAL AT WRITER GAP POLE

(75) Inventors: Ibro Tabakovic, Edina, MN (US); Paul A. Jallen, Elko, MN (US); John Rice, Long Lake, MN (US); Steve C. Riemer, Minneapolis, MN (US); Venkateswara R. Inturi, Shakopee, MN (US); Lyle P. Cox, Long Lake, MN (US); Hong Wang, Savage, MN (US); Robbee L. Grimm, Lakeville, MN (US); Erik Hutchinson, Lakeville, MN (US); Charles Ericson, Oakdale, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 288 days.

(21) Appl. No.: 10/084,729

(22) Filed: Oct. 24, 2001

(65) Prior Publication Data

US 2002/0145824 A1 Oct. 10, 2002

Related U.S. Application Data

(60) Provisional application No. 60/247,369, filed on Nov. 10, 2000.

(51) Int. Cl.[7] .............................................. G11B 5/147
(52) U.S. Cl. ...................................................... 360/126
(58) Field of Search ......................................... 360/126

(56) References Cited

U.S. PATENT DOCUMENTS

| | | | |
|---|---|---|---|
| 5,543,973 A | 8/1996 | Moriyama | 360/17 |
| 5,552,589 A | 9/1996 | Smith et al. | 235/449 |
| 5,576,098 A | 11/1996 | Arimoto et al. | 428/332 |
| 5,585,977 A | 12/1996 | Gooch | 360/84 |
| 5,590,008 A * | 12/1996 | Tanabe et al. | 360/126 |
| 5,593,513 A | 1/1997 | Ramanan et al. | 148/304 |
| 5,593,518 A | 1/1997 | Ramanan | 148/304 |
| 5,602,704 A | 2/1997 | Gooch et al. | 360/125 |
| 5,606,478 A | 2/1997 | Chen et al. | 360/126 |
| 5,639,509 A | 6/1997 | Schemmel | 427/130 |
| 5,663,857 A | 9/1997 | Kumura et al. | 360/126 |
| 5,701,223 A | 12/1997 | Fontana, Jr. et al. | 360/113 |
| 5,729,413 A | 3/1998 | Gooch et al. | 360/125 |
| 5,742,457 A | 4/1998 | Simmons et al. | 360/113 |
| 5,751,526 A | 5/1998 | Schemmel | 360/113 |
| 5,768,073 A | 6/1998 | Nepela et al. | 360/126 |
| 5,808,843 A | 9/1998 | Kobayashi et al. | 360/113 |
| 5,812,350 A | 9/1998 | Chen et al. | 360/126 |
| 5,856,899 A | 1/1999 | Aoyagi et al. | 360/127 |
| 5,864,450 A | 1/1999 | Chen et al. | 360/113 |
| 5,871,593 A | 2/1999 | Fish et al. | 148/304 |
| 5,926,350 A | 7/1999 | Chiu et al. | 360/121 |
| 5,930,085 A | 7/1999 | Kitade et al. | 360/113 |
| 5,949,624 A | 9/1999 | Simmons et al. | 360/113 |

(List continued on next page.)

FOREIGN PATENT DOCUMENTS

| | | |
|---|---|---|
| JP | 63-243016 | 10/1988 |
| JP | 5-120847 | 5/1993 |
| JP | 5-166406 | 7/1993 |
| JP | 6-168748 | 6/1994 |
| JP | 7-4382 | 1/1995 |

*Primary Examiner*—Robert S. Tupper
(74) *Attorney, Agent, or Firm*—Westman, Champlin & Kelly

(57) ABSTRACT

A magnetic head for use in magnetic data storage systems is provided. The magnetic head includes a substantially non-magnetic writer gap layer and pair of magnetic poles separated by the writer gap layer. A first of the poles includes a first layer formed of a CoNiFe alloy that has a saturation magnetic moment greater than 2.1 Tesla. Methods of fabricating such a head are also disclosed.

20 Claims, 6 Drawing Sheets

U.S. PATENT DOCUMENTS

| | | | |
|---|---|---|---|
| 5,966,277 A | 10/1999 | Koshikawa et al. | 360/126 |
| 5,966,800 A | 10/1999 | Huai et al. | 29/603.13 |
| 6,001,468 A | 12/1999 | Tagawa | 428/332 |
| 6,034,847 A | 3/2000 | Komuro et al. | 360/126 |
| 6,038,110 A | 3/2000 | Aboaf et al. | 360/126 |
| 6,056,996 A | 5/2000 | Yoda et al. | 427/130 |
| 6,064,546 A | 5/2000 | Takano et al. | 360/97.01 |
| 6,090,260 A | 7/2000 | Inoue et al. | 205/102 |
| 6,115,216 A | 9/2000 | Yoda et al. | 360/113 |
| 6,118,629 A | 9/2000 | Huai et al. | 360/126 |
| 6,156,487 A | 12/2000 | Jennison et al. | 430/316 |
| 6,178,070 B1 | 1/2001 | Hong et al. | 360/317 |
| 6,180,421 B1 | 1/2001 | Futai et al. | 438/3 |
| 6,190,764 B1 | 2/2001 | Shi et al. | |
| 6,597,543 B1 * | 7/2003 | Saitho et al. | 360/126 |
| 6,654,203 B2 * | 11/2003 | Yari et al. | 360/126 |

* cited by examiner

ELECTRODEPOSITED HIGH-MAGNETIC-MOMENT MATERIAL AT WRITER GAP POLE

CROSS-REFERENCE TO RELATED APPLICATION

This application claims the benefit of U.S. Provisional Patent Application No. 60/247,369, entitled "ELECTRODEPOSITED HIGH MAGNETIC MOMENT MATERIAL AT WRITER GAP FOR IMPROVED PERFORMANCE OF THE GMR HEAD," filed on Nov. 10, 2000.

FIELD OF THE INVENTION

The present invention relates generally to magnetic data storage systems. More particularly, the present invention relates to a magnetic writer pole used in such systems.

BACKGROUND OF THE INVENTION

Magnetic heads mounted on a magnetic disc drive are required to provide larger magnetic fields with higher gradient for magnetic recording at higher density. More recent magnetic heads combine both a magnetoresistive (MR) or giant magnetoresistive (GMR) element for reading information from a magnetic medium and an inductive element for writing information to such a magnetic medium. Such magnetic heads are typically referred to as composite thin film magnetic heads or merged GMR heads. The magnetic head is mounted or embedded in a slider which is supported in transducing relationship with respect to a magnetic medium.

The inductive write head element includes first and second poles which have first and second pole tips respectively. The pole tips are separated by a gap at an air bearing surface (ABS) or head surface. A coil is positioned between the first and second poles. Applying an electrical current to the coil results in a magnetic field being generated between the poles. The direction of the current through the coil determines the polarity of the induced magnetic field. The induced magnetic field causes magnetic particles in the adjacent magnetic medium to line up in one direction or the other, depending on the polarity of the induced magnetic field. In this way, information is written on the magnetic medium.

Flux density, which is a measure of the quantity of magnetism, needs to be high in the inductive head element for it to provide a high magnetic field for writing. There are limitations to the capability of the inductive head element to provide high flux density since materials have a saturation level beyond which they will conduct no more flux. Similarly, magnetic moment, which is a measure of the strength of the magnet, does not change beyond a certain level (reaches saturation) even if the strength of the applied magnetic field is increased. A high saturation magnetic moment is very desirable for write heads recording at high areal densities, the areal density being the amount of data that can be squeezed on to a given area of the magnetic medium. If the pole tip saturates, it loses its permeability, and will eventually act as an additional writer gap. Saturated pole tips result in increases in pulse width and bit curvature. Consequently, it becomes very difficult to write at high areal densities because of the poor resolution of the bit/transition. Further, finite element modeling or analysis of magnetic recording indicates that a high saturation magnetic moment is particularly critical for those magnetic layers adjacent to the non-magnetic gap layer of the write head.

The use of materials with high magnetic moment for writer pole tips allows for the generation of higher magnetic fields in the magnetic media, larger field gradients, and faster effective rise times. Improvements, such as narrower pulse widths, smaller erase bands, and straighter transitions for given media properties are possible if materials with high magnetic moment are used for the poles. In addition, increased over-write (OVW) on magnetic media having high coercivity can also be achieved with high moment poles. OVW, expressed in dB, is a measure of how well prior recorded information can be erased by over writing the medium with a different signal. All the above advantages become even more important at high areal densities of magnetic recording.

Efforts to find high moment alternatives to permalloy $Ni_{80}Fe_{20}$ (saturation magnetization $(B_s)=1.0$ Tesla (T)) and $Ni_{45}Fe_{55}$ ($B_s=1.6$ T) typically involve alloying them with cobalt. Also, other non-magnetic elements are sometimes added to modify the properties of materials. Electrodeposition of the binary CoFe alloys, ternary CoNiFe, CoFeCu, and quaternary CoNiFeCu and CoNiFeS have been reported. High saturation magnetization films with soft magnetic properties, low magnetostriction, low stress, and high corrosion resistance are required in writing on high coercive recording media. However, the plated films need to be smooth and lump-free (free of defects). Although there are many techniques available to achieve high saturation moment at the pole tips, these techniques are relatively expensive and difficult to control. The electrochemical process needs to be easy to control while maintaining the required magnetic, corrosion, and mechanical properties.

The present invention provides a solution to these and other problems and offers other advantages over the prior art.

SUMMARY OF THE INVENTION

The present invention relates to magnetic writer poles used in magnetic data storage systems.

One embodiment of the present invention is directed to a magnetic head having a non-magnetic writer gap layer and a pair of magnetic poles separated by the writer gap layer. At least one of the poles includes a layer composed of a CoNiFe alloy that has a saturation magnetic moment greater than 2.1 T.

In one embodiment of the above-described magnetic head, the CoNiFe alloy has a saturation magnetic moment of about 2.1–2.3 T.

In another embodiment of the above-described magnetic head, the pole also has a second layer of CoNiFe alloy having a saturation magnetic moment greater than 1.8 T. The second layer is disposed adjacent the first layer opposite the writer gap layer.

Another embodiment of the present invention is directed to a method of forming a magnetic head. Pursuant to the method a substantially non-magnetic writer gap layer is formed. A pair of magnetic poles is formed, one on each side of the writer gap layer. At least one of the poles includes a layer comprising a CoNiFe alloy that has a saturation magnetic moment greater than 2.1 T.

In one embodiment of the above method, the CoNiFe alloy has a saturation magnetic moment of about 2.2 T.

In another embodiment of the above method, the pole also has a second layer of CoNiFe alloy having a saturation magnetic moment greater than 1.8 T. The second layer is formed adjacent the first layer opposite the writer gap layer.

These and various other features as well as advantages which characterize the present invention will be apparent upon reading of the following detailed description and review of the associated drawings.

BRIEF DESCRIPTION OF THE DRAWINGS

FIGS. 8-1 to 8-6 are collectively a compiled plot of six magnetization curves and hysteresis loops for varying thickness ratios of 1.8 T CoNiFe verses 2.2 T CoNiFe.

DETAILED DESCRIPTION

Figure 1:
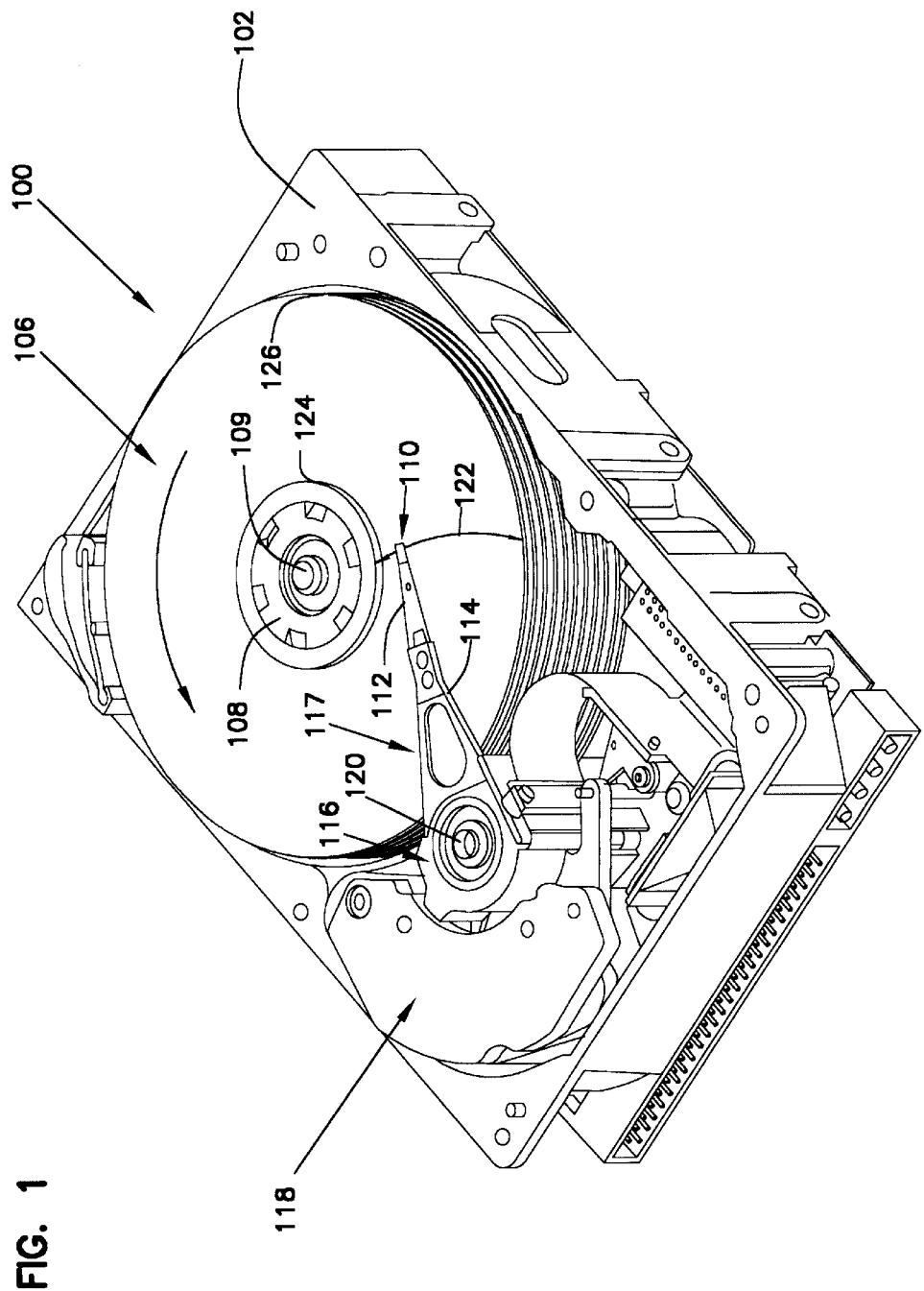
FIG. 1 is a plan view of a disc drive suitable for use with the present invention.

FIG. 1 is a top view of a disc drive 100 in accordance with one embodiment of the present invention. Disc drive 100 includes a disc pack 106 mounted for rotation about spindle 109. Disc pack 106 includes a plurality of individual discs, each of which include concentric tracks, or cylinders, for receiving and storing data in the form of magnetic flux reversals encoded on the tracks. Disc drive 100 also includes an actuator 116 mounted to a base 102 and pivotally moveable relative to discs 106 about pivot shaft 120. Actuator 116 includes E-block assembly 117 which includes a plurality of actuator arms 114. Each actuator arm 114 is attached to one or more flexure arms 112. Each flexure arm 112 supports a data head 110. Data head 110 includes a hydrodynamic air bearing, or slider, which supports a transducer for reading information from and encoding information to one of the discs 106. In an illustrative embodiment, actuator 116 includes a voice coil motor (VCM), or moving coil motor, shown generally at 118. Disc drive 100 further includes a drive controller (not shown) which is coupled to a host system or another controller which controls a plurality of drives. In an illustrative embodiment, the drive controller is a microprocessor, or digital computer. The drive controller is either mountable within disc drive 100, or is located outside of disc drive 100 with suitable connection to actuator 116.

During operation, the drive controller receives position information indicating a track of the disc 106 to be accessed. The drive controller receives the position information from an operator, from a host computer, or from another suitable controller. Based on the position information, the drive controller provides a position signal to actuator 116. The position signal causes actuator 116 to pivot about pivot shaft 120. In an illustrative embodiment, the position signal comprises a current supplied to the voice coil motor 118, causing actuator 116 to pivot about pivot shaft 120. This, in turn, causes data head 110 to move radially over the surface of the disc 106 in a generally arcuate path indicated by arrow 122.

Data head 110 is a magnetically inductive head that records information on disc 106 by inducing a magnetic field in the vicinity of disc 106, thereby causing magnetic particles on the surface of disc 106 to align according to the polarity of the induced magnetic field. In an illustrative embodiment of the present invention, data head 110 is a merged magnetoresistive (MR) or giant magnetoresistive (GMR) head that can be employed for reading information stored on disc 106 as well as recording information thereon.

Figure 2:
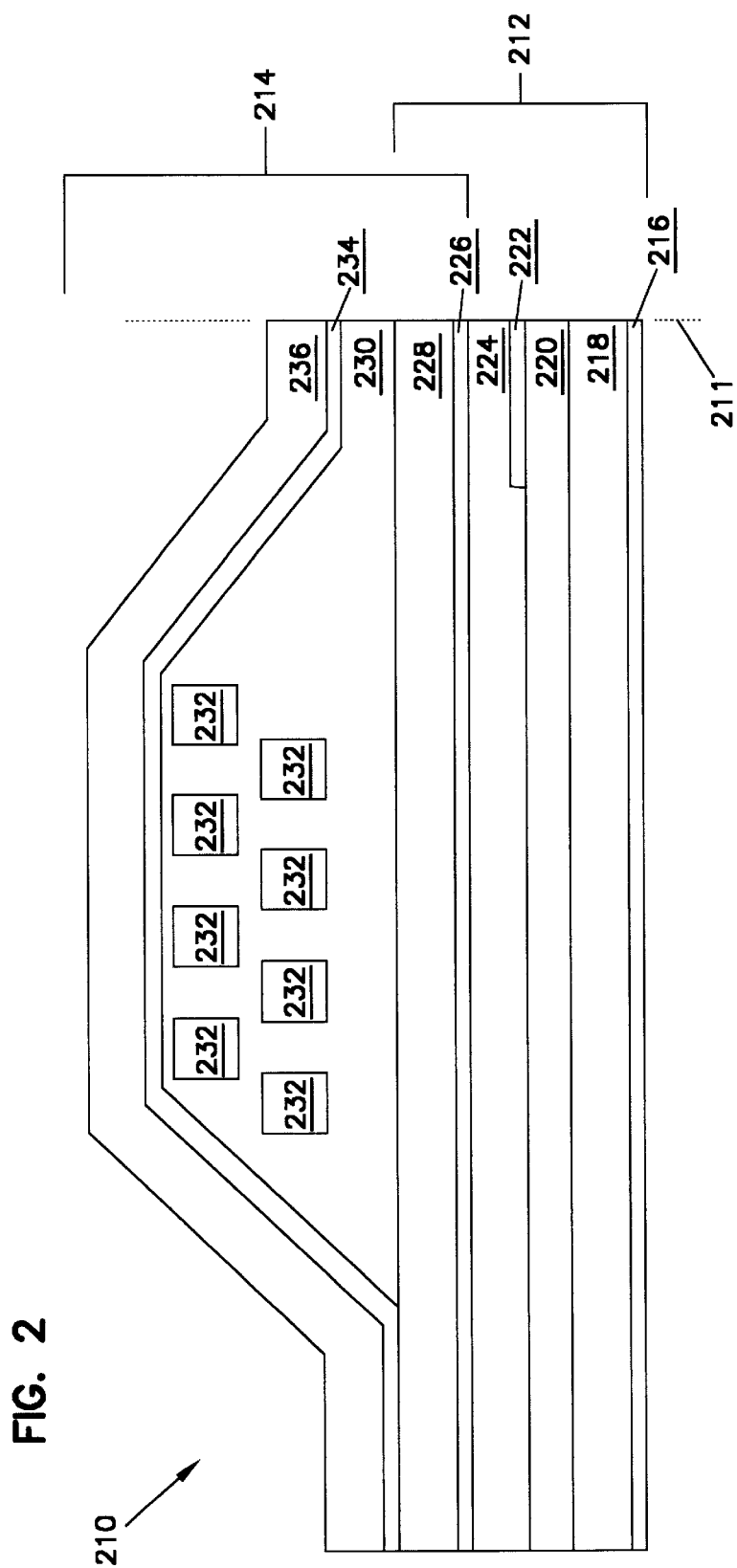
FIG. 2 is a cross-sectional view of a prior art data head.

FIG. 2 is a cross-sectional view of prior art data head 210 taken along a plane normal to ABS 211 of data head 210. Data head 210 corresponds to data head 110 shown in FIG. 1. Data head 210 is a merged GMR head that includes reader portion 212 and writer portion 214. Reader portion 212 of data head 210 includes bottom shield seed layer 216, bottom shield 218, first gap layer 220, GMR read element 222, second gap layer 224, shared pole seed layer 226 and shared pole 228. It will be noted that the present application makes references to "top" and "bottom" orientations. However, it is to be understood that a magnetic data storage system in which a GMR head may be used can be disposed in any spatial orientation. To simplify the discussion herein, "top" will be used to denote the portion of the merged GMR head that is on the "writer side" of the shared pole of the merged GMR head.

A read gap is defined on the ABS 211 of data head 210 between terminating ends of bottom shield 218 and shared pole 228. GMR read element 222 is positioned between terminating ends of first gap layer 220 and second gap layer 224. First and second gap layers 220 and 224 are positioned between bottom shield 218 and shared pole 228. Bottom shield seed layer 216, upon which bottom shield 218 is layered, and shared pole seed layer 226, upon which shared pole 228 is layered, are each selected to promote the desired magnetic properties of respective bottom shield 218 and shared pole 228.

Writer portion 214 of data head 210 includes shared pole seed layer 226, shared pole 228, write gap layer 230, conductive coils 232, top pole seed layer 234 and top pole 236. A write gap is defined on the ABS 211 by write gap layer 230 between terminating ends of shared pole 228 and top pole 236. Conductive coils 232 are positioned in write gap layer 230 between shared pole 228 and top pole 236, such that the flow of electrical current through conductive coils 232 generates a magnetic field across the write gap. Top pole seed layer 234, upon which top pole 236 is layered, is selected to promote the desired magnetic properties of top pole 236.

Data head 210 is a merged GMR head in which shared pole 228 serves as both a top shield in reader portion 212 and a bottom pole of writer portion 214. If data head 110 were a piggyback GMR head, the bottom pole and the top shield would be formed of two separate layers.

The performance of writer portion 214 of data head 210 is strongly tied to the magnetic characteristics of top pole 236 and shared pole 228, which in turn are a function of the materials and processes used in the construction of top pole 236 and shared pole 228. In particular, it is desirable that the top pole 236 and shared pole 228 each have soft magnetic properties, such as high permeability to increase the efficiency of the writer 214, a high saturation magnetization to increase the strength of the write gap field, a high corrosion resistance to increase the life of writer 214, and a high resistivity to minimize eddy currents in shared pole 228 and top pole 236.

In prior art transducing heads, top pole 236 and shared pole 228 are commonly formed of materials such as permalloy ($Ni_{81}Fe_{19}$), which has a relative permeability of approximately 1000 at 10 MHz and a saturation magnetization of approximately 1 T. Sendust ($Al_{5.4}Fe_{65}Si_{9.6}$), which has a permeability of approximately 1000 at 10 MHz and a saturation magnetization of approximately 1.1 T, is also commonly used. $Ni_{45}Fe_{55}$, which has a permeability of approximately 1000 at 10 MHz and a saturation magnetization of approximately 1.6 T is another commonly used material. Although these materials proved useful in prior art transducing heads, recent demand for increased data storage densities require magnetic poles in writers to have a saturation magnetization in excess of those achieved in poles formed of permalloy, sendust or $Ni_{45}Fe_{55}$. Prior attempts of using higher magnetic moment materials in forming the poles to increase the saturation magnetization of the writer poles have negatively impacted several of the other important properties of the writer, such as decreasing the permeability and/or the corrosion resistance of the poles, or resulting in less robust manufacturing processes necessary to build the transducing head.

The present invention demonstrates the development of a high magnetic moment material at the writer gap by an electrodeposition of monolayer or bilayer of two materials, 2.2 T CoNiFe and 1.8 T CoNiFe, for use in the write poles in magnetic write heads. In an illustrative embodiment, these materials are employed to form the top write pole of a merged GMR data head. This invention extends the capabilities of writer heads, particularly pulse width and overwrite capabilities, for high areal density and high frequency applications.

The properties of the two materials, 2.2 T CoNiFe and 1.8 T CoNiFe, used to form a write pole according to the present invention are shown in Table 1.

TABLE 1

Properties of 2.2 T CoNiFe and 1.8 T CoNiFe materials

| Property | 2.2 T CoNiFe | 1.8 T CoNiFe |
| --- | --- | --- |
| XRF composition (Wt. %) | $Co_{57-67}Ni_{0.5-4.0}Fe_{24-42}$ | $Co_{63-75}Ni_{11-19}Fe_{14-19}$ |
| Saturation magnetization | 2.1–2.3 T | 1.8–1.85 T |
| Coercivity ($H_{c,e}$) | 18 Oe at 0.3 $\mu$m thickness | 0.8–1.4 Oe |
| Coercivity ($H_{c,h}$) | 10 Oe at 0.3 $\mu$m thickness | 0.1–0.2 Oe |
| Unaxial anisotropy | | 15–18 Oe |
| Magnetostriction | $4 \times 10^{-5}$ | $3 \times 10^{-6}$ |
| Initial permeability | 150 | 1200 |
| Structure/texture | bcc (110) | fcc (111), (200) + bcc (110) |
| Grain size | 10–15 nm | 8–10 nm |
| Resistivity | 10–12 $\mu\Omega$-cm | 15–18 $\mu\Omega$-cm |

As used in this application, the designation "2.2 T CoNiFe" refers to any composition of CoNiFe alloy having a saturation magnetization of approximately 2.2 T. In one embodiment, the designation "2.2 T CoNiFe" refers to any composition of CoNiFe alloy having a saturation magnetization in a range of 2.1–2.3 T. As can be seen in Table 1, a CoNiFe alloy having atomic percentages of approximately 57–67% cobalt, 0.5–4.0% nickel, and 24–42% iron will have a saturation magnetization of approximately 2.1–2.3 T. Thus, in one embodiment of the present invention, the designation "2.2 T CoNiFe" refers to an alloy of CoNiFe having those atomic percentages.

As used in this application, the designation "1.8 T CoNiFe" refers to any composition of CoNiFe alloy having a saturation magnetization of approximately 1.8 T. In one embodiment, the designation "1.8 T CoNiFe" refers to any composition of CoNiFe alloy having a saturation magnetization in a range of 1.8–1.85 T. As can be seen in Table 1, a CoNiFe alloy having atomic percentages of approximately 63–75% cobalt, 11–19% nickel, and 14–19% iron will have a saturation magnetization of approximately 1.8–1.85 T. Thus, in one embodiment of the present invention, the designation "1.8 T CoNiFe" refers to an alloy of CoNiFe having those atomic percentages.

Figure 3:
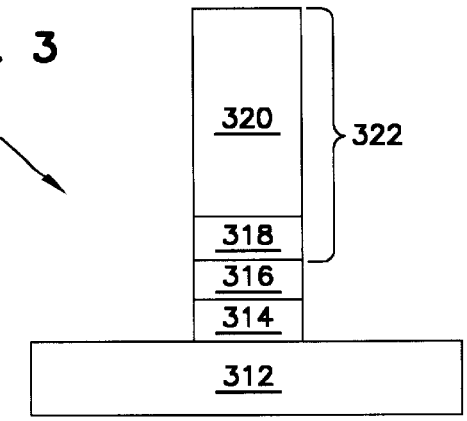
FIG. 3 is a schematic drawing of a merged GMR head according to an illustrative embodiment of the present invention.
Figure 4:
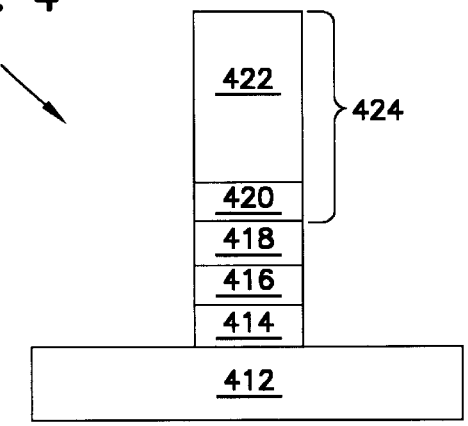
FIG. 4 is a schematic drawing of a merged GMR head according to an illustrative embodiment of the present invention.
Figure 5:
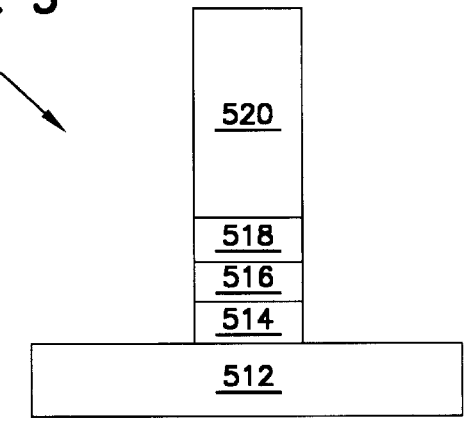
FIG. 5 is a schematic drawing of a merged GMR head according to an illustrative embodiment of the present invention.

In an illustrative embodiment, the present invention employs 2.2 T CoNiFe and 1.8 T CoNiFe at the writer gap to improve performance of the GMR head. FIGS. 3 to 5 are schematic drawings depicting the use of 2.2 T CoNiFe and 1.8 T CoNiFe for the top write pole of a merged GMR head according to illustrative embodiments of the present invention. In FIGS. 3 to 5, the shared poles correspond to shared pole 228 of FIG. 2, the writer gap layers correspond to writer gap layer 230 of FIG. 2, and the top poles generally correspond to top pole 236 of FIG. 2.

FIG. 3 depicts the use of a bilayer comprised of 2.2 T CoNiFe and 1.8 T CoNiFe for the top write pole of a merged GMR head 310 according to an illustrative embodiment of the present invention. FIG. 3 shows that notch layer 314 is formed adjacent shared pole 312. Writer gap layer 316 is formed adjacent notch layer 314 opposite shared pole 312. The top pole 322 of merged GMR head 310 comprises first pole layer 318 and second pole layer 320. According to an illustrative embodiment of the present invention, first pole layer 318 is formed of 2.2 T CoNiFe and second pole layer 320 is formed of 1.8 T CoNiFe. Modeling predicts that 2.2 T CoNiFe film extends the thickness range of the degrading flux of 1.8 T CoNiFe, which has been used in the final layer. In an alternative embodiment, second pole layer 320 is comprised of another magnetic material, illustratively 1.6 T NiFe. In the embodiment shown in FIG. 3, which employs PdNi, NiCu or NiP in the writer gap layer 316, first pole layer 318 is formed by electrodepositing 2.2 T CoNiFe directly on a PdNi, CuNi or NiP substrate through a single lithographic mask. In an illustrative embodiment, notch layer 314 comprises 1.6 T NiFe or 1.8 T CoNiFe.

FIG. 4 depicts the use of a bilayer comprised of 2.2 T CoNiFe and 1.8 T CoNiFe for the top write pole of a merged GMR head 410 according to an alternative embodiment of the present invention. FIG. 4 shows that notch layer 414 is formed adjacent shared pole 412. Writer gap layer 416 is formed adjacent notch layer 414 opposite shared pole 412. In an illustrative embodiment, writer gap layer 416 is comprised of sputtered alumina ($Al_2O_3$). In a writer head with a sputtered alumina gap 416, a high moment seed layer 418 is illustratively formed adjacent writer gap layer 416, opposite shared pole 412. Seed layer 418 is illustratively comprised of 2.4 T CoFe that is deposited by vacuum deposition. The top pole 424 of merged GMR head 410 comprises first pole layer 420 and second pole layer 422. According to an illustrative embodiment of the present invention, first pole layer 420 is formed of 2.2 T CoNiFe and second pole layer 422 is formed of 1.8 T CoNiFe. First pole layer 420 is plated on seed layer 418. In an alternative embodiment, second pole layer 320 is comprised of another magnetic material, illustratively 1.6 T NiFe. In an illustrative embodiment, notch layer 414 comprises 1.6 T NiFe or 1.8 T CoNiFe.

FIG. 5 depicts the use of a monolayer comprised of 2.2 T CoNiFe or 1.8 T CoNiFe for the top write pole of a merged GMR head 510 according to an illustrative embodiment of the present invention. FIG. 5 shows that notch layer 514 is formed adjacent shared pole 512. Writer gap layer 516 is formed adjacent notch layer 514 opposite shared pole 512. According to an illustrative embodiment of the present invention, top pole layer 520 is formed of 2.2 T CoNiFe. In an alternative embodiment, top pole layer 520 is formed of 1.8 T CoNiFe. In an illustrative embodiment of the monopole configuration shown in FIG. 5, writer gap layer 516 is comprised of sputtered alumina ($Al_2O_3$). In a writer head with a sputtered alumina gap 516, a high moment seed layer 518 is illustratively formed adjacent writer gap layer 516, opposite shared pole 512. Seed layer 518 is illustratively comprised of 2.4 T CoFe that is deposited by vaccum deposition. An alternative embodiment of the monopole configuration utilizes PdNi in the writer gap layer 516. When PdNi is used in the writer gap layer 516, pole layer 520 is plated directly over writer gap layer 516 without utilizing a seed layer 518. In an illustrative embodiment of merged GMR head 510, notch layer 514 comprises 1.8 T CoNiFe or 2.2 T CoNiFe.

Figure 6:
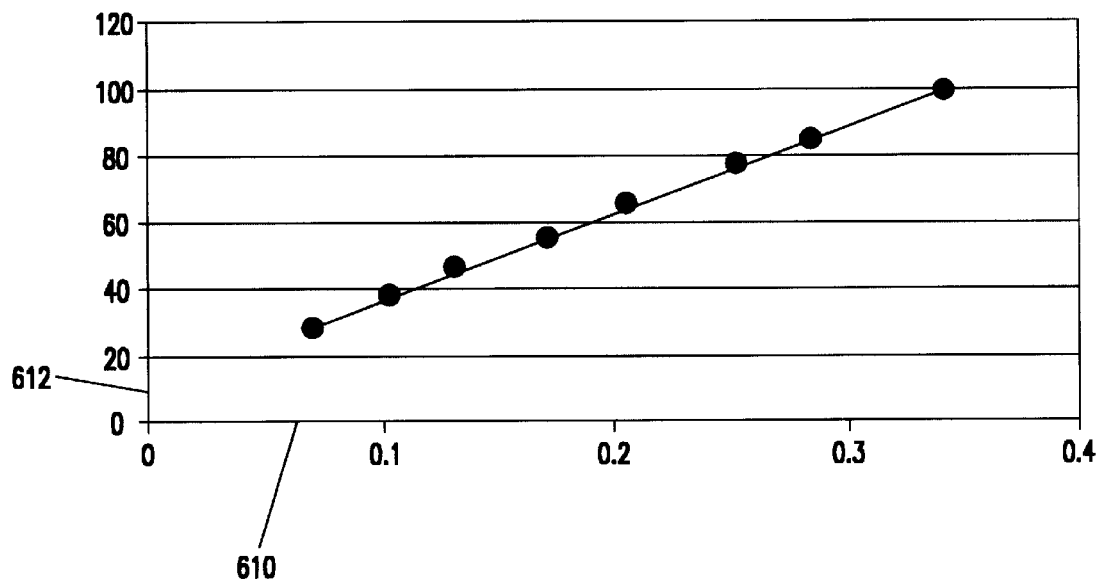
FIG. 6 is a graph plotting the magnetic flux of 2.2 T CoNiFe film verses the thickness of the film.

Electrodeposited 2.2 T CoNiFe is a hard magnetic material with high magnetic saturation ($B_s$=2.1–2.3 T) and coercivity. FIG. 6 is a plot of the magnetic flux of 2.2 T CoNiFe film verses the thickness of the film. X-axis 610 represents the thickness of the film in $\mu$m and y-axis 612 represents magnetic flux in nW. FIG. 6 shows that the magnetic flux increases linearly with thickness. The y-intercept is 11.8 nW at zero thickness of 2.2 T CoNiFe material. The flux is due to 1000 Angstroms (A) of permalloy seed layer employed in the instant trial. By dividing the slope of the curve in FIG. 6 with the length of plated wafer (11.05 cm×conversion factor), an average $B_s$ value of 2.29 T was obtained. It has been determined experimentally that plating a 1.8 T CoNiFe layer over a 0.3 $\mu$m layer of 2.2 T CoNiFe gradually decreases the magnetic saturation magnetization from 2.29 T (thickness of 1.8 T CoNiFe is 0 $\mu$m) to 1.82 T (thickness of 1.8 T CoNiFe is 3.2 $\mu$m).

Figure 7:
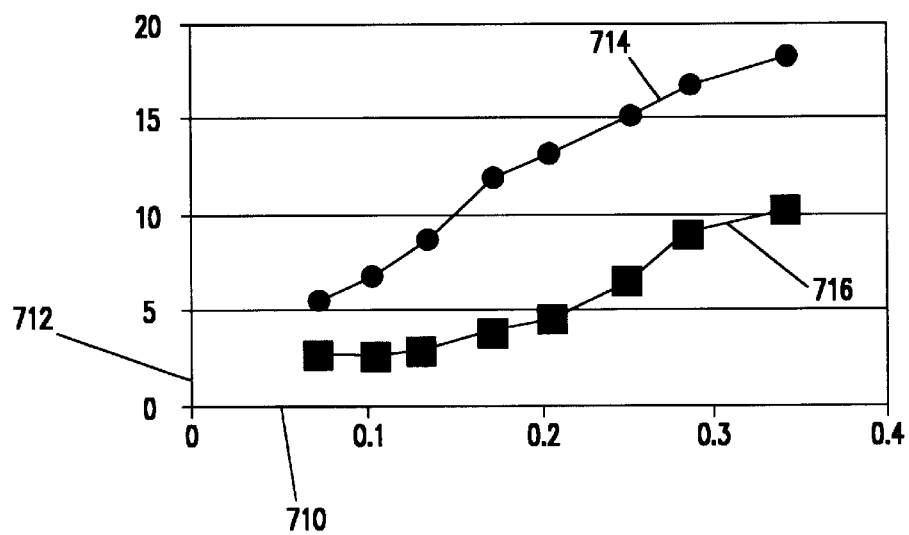
FIG. 7 is a graph plotting the coercivity of 2.2 T CoNiFe verses the thickness of the film.

FIG. 7 is a graph plotting the coercivity of 2.2 T CoNiFe verses the thickness of the film. X-axis 710 represents the thickness of the film in $\mu$m and y-axis 712 represents the coercivity $H_c$ in Oersteds (Oe). Plot 714 represents coercivity $H_{c,e}$ and plot 716 represents coercivity $H_{c,h}$. The trial used to obtain the plots of FIG. 7 employed a permalloy seed layer. FIG. 7 shows that the coercivity of CoNiFe films increases with thickness. The mechanism of $H_c$ increase can be attributed to several factors. Coupling of the permalloy seed layer of lower coercivity results in a higher coercivity as the thickness of the CoNiFe layer is increased. Also, an increase in the grain size contributes to an increase in coercivity. An increase in the roughness also contributes to a higher coercivity. Additionally, a change in the interaction of the magnetic grain size also contributes to increased coercivity as the thickness of the CoNiFe film increases.

Figures 1, 8:
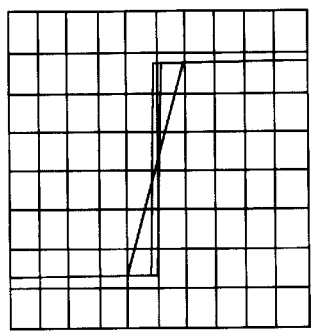
Figures 2, 8:
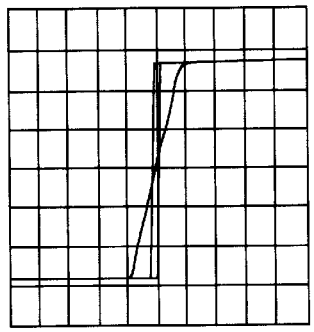
Figures 3, 8:
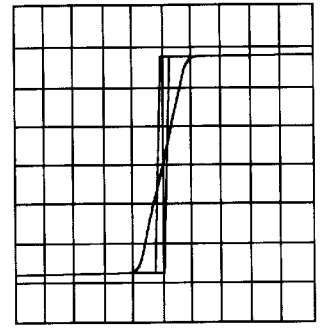
Figures 4, 8:
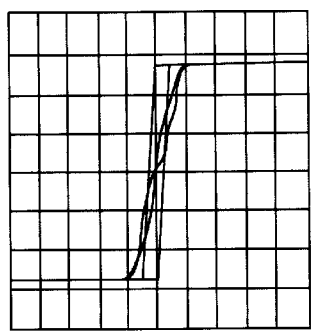
Figures 5, 8:
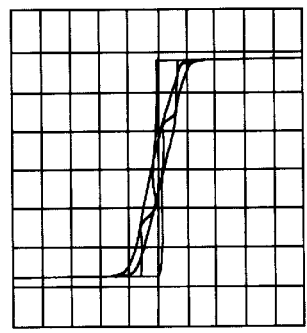
Figures 6, 8:
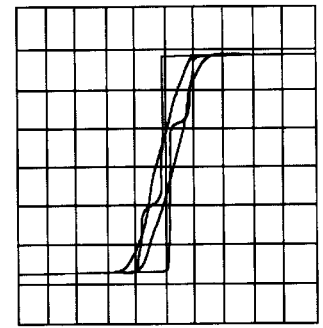

FIGS. 8-1 to 8-6 are collectively a compiled plot of six magnetization curves and hysteresis loops (BH-loops) for varying thickness ratios of 1.8 T CoNiFe (second layer)/2.2 T CoNiFe (first layer). FIG. 8-1 shows a BH-loop for a bilayer having a 2.2 T CoNiFe layer of 0.156 $\mu$m thickness and a 1.8 T CoNiFe layer of 2.55 $\mu$m thickness. FIG. 8-2 shows a BH-loop for a bilayer having a 2.2 T CoNiFe layer of 0.26 $\mu$m thickness and a 1.8 T CoNiFe layer of 2.42 $\mu$m thickness. FIG. 8-3 shows a BH-loop for a bilayer having a 2.2 T CoNiFe layer of 0.34 $\mu$m thickness and a 1.8 T CoNiFe layer of 2.34 $\mu$m thickness. FIG. 8-4 shows a BH-loop for a bilayer having a 2.2 T CoNiFe layer of 0.43 $\mu$m thickness and a 1.8 T CoNiFe layer of 2.20 $\mu$m thickness. FIG. 8-5 shows a BH-loop for a bilayer having a 2.2 T CoNiFe layer of 0.52 $\mu$m thickness and a 1.8 T CoNiFe layer of 2.10 $\mu$m thickness. FIG. 8-6 shows a BH-loop for a bilayer having a 2.2 T CoNiFe layer of 0.63 $\mu$m thickness and a 1.8 T CoNiFe layer of 2.00 $\mu$m thickness. In each of FIGS. 8-1 to 8-6, x-axis 810 represents the field strength, H, in Oersteds and y-axis 812 represents the induction, B, in gausses. FIGS. 8-1 to 8-6 demonstrate that increasing the thickness of hard 2.2 T CoNiFe and decreasing the thickness of the soft 1.8 T CoNiFe layer gave a bilayer structure (primarily seen in FIGS. 8-4 to 8-6). Inversely, FIGS. 8-1 to 8-3 show that the bilayers are soft materials with small values of both $H_{c,e}$ and $H_{c,h}$ axes. FIGS. 8-4 to 8-6 show the change in shape with the opening of the hard ($H_{c,h}$) axes.

Figure 9:
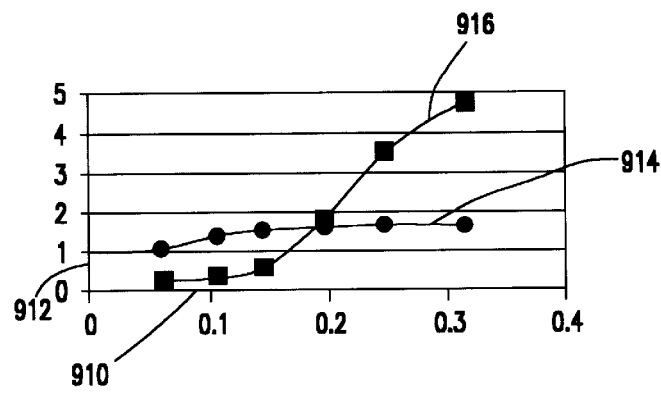
FIG. 9 is a graph plotting the coercivity of a bilayer of 2.2 T CoNiFe and 1.8 T CoNiFe verses the thickness ratio of the film.

FIG. 9 is a graph plotting the coercivity of a bilayer of 2.2 T CoNiFe and 1.8 T CoNiFe verses the thickness ratio of the film. The plot of FIG. 9 was obtained by plotting the $H_{c,e}$ and $H_{c,h}$ values obtained from FIGS. 8-1 to 8-6 verses the ratio of the thickness of the 2.2 T CoNiFe film to the thickness of the 1.8 T CoNiFe film. X-axis 910 represents the thickness of the film in $\mu$m and y-axis 912 represents the coercivity $H_c$ in Oe. Plot 914 represents coercivity $H_{c,e}$ and plot 916 represents coercivity $H_{c,h}$. Comparing FIG. 9 with FIG. 7, it can be seen that plating a soft 1.8 T CoNiFe film over a 2.2 T CoNiFe film decreases the coercivity exponentially. FIG. 9 suggests that the opening of the hard ($H_{c,h}$) axes occurs when the thickness ratio is greater than 0.15. Thus, according to an illustrative embodiment of the present invention, the maximum thickness ratio is 0.15. In an alternative embodiment, the thicknesses of the 2.2 T CoNiFe and 1.8 T CoNiFe are such that the thickness ration is in a range of approximately 0.12–0.17. It has been determined experimentally that a bilayer structure combining hard magnetic 2.2 T CoNiFe and soft magnetic 1.8 T CoNiFe in a thickness ratio of 0.15 yields a bilayer that behaves as a single magnetic layer with a coercivity $H_{c,e}$ of about 1.3 Oe and a coercivity $H_{c,h}$ of about 0.38 and a saturation magnetization $B_s$ of greater than 1.8 T.

Figure 10:
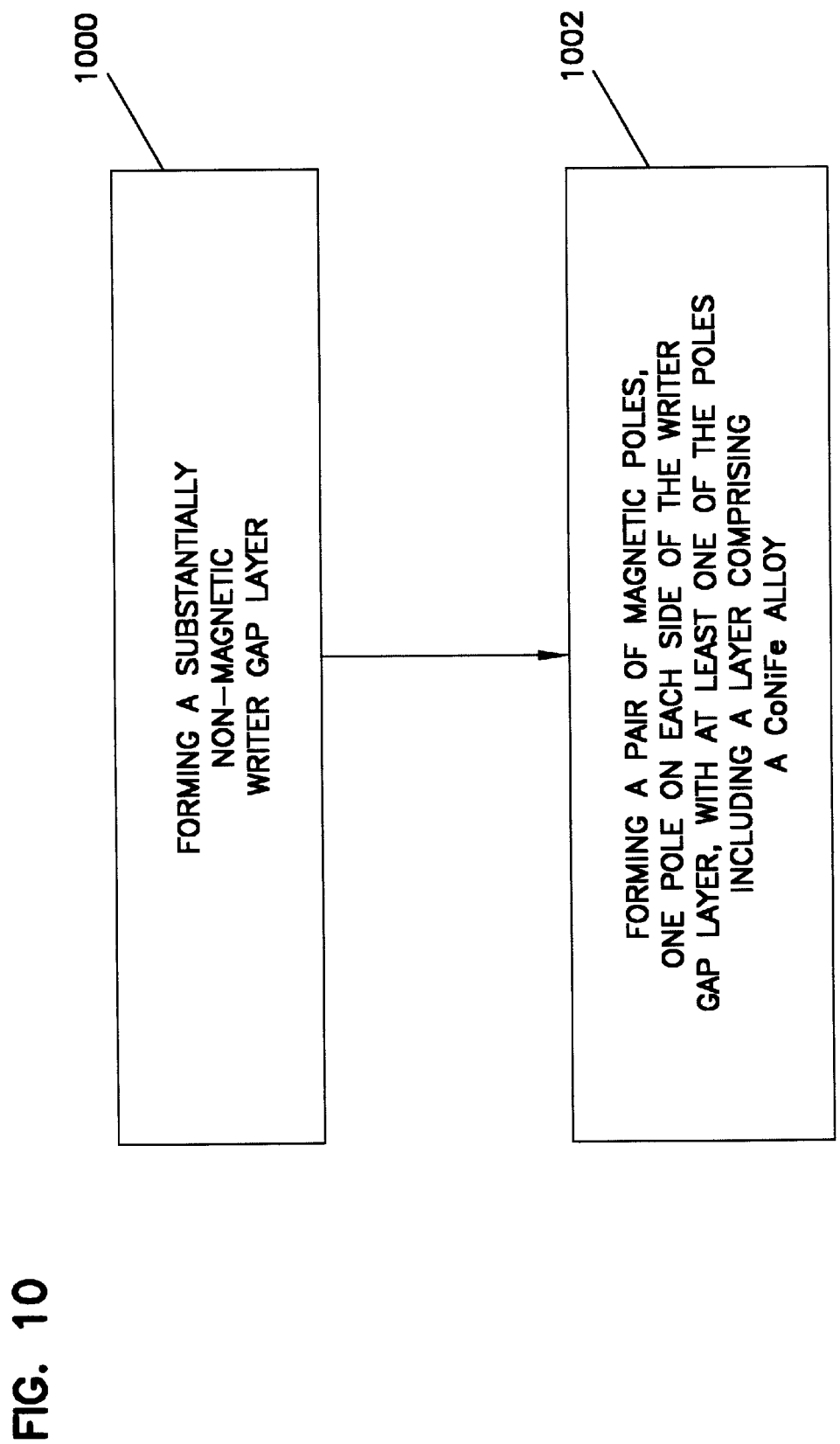
FIG. 10 is a flow chart representing a method of forming a magnetic head according to an illustrative embodiment of the present invention.

FIG. 10 is a flow chart representing a method of forming a magnetic head according to an illustrative embodiment of the present invention. At step 1000 a substantially nonmagnetic writer gap layer is formed. At step 1002, a pair of magnetic poles is formed, one pole on each side of the writer gap layer. At least one of the poles includes a layer comprising a CoNiFe alloy.

In an illustrative embodiment of the method represented in FIG. 10, the CoNiFe alloy has a saturation magnetic moment of about 2.1–2.3 T. In another embodiment, the CoNiFe alloy has a saturation magnetic moment of about 1.8–1.85 T.

In another embodiment of the method of FIG. 10, at least one of the poles is comprised of a first layer of CoNiFe having a saturation magnetic moment of about 2.1–2.3 T and a second layer of CoNiFe having a saturation magnetic moment of about 1.8–1.85 T.

In one embodiment of method of FIG. 10, the CoNiFe layer is formed via electrochemical deposition. In another embodiment, the CoNiFe layer is formed by plating the layer through a lithographic mask. It has been found that lump-free CoNiFe films with the observed properties listed in Table 1 can be obtained by plating through a lithographic mask.

Roughness of 2.2 T CoNiFe films increases with increasing thickness of the film (plated over PdNi or permalloy substrate) from $R_q=4.2$ nm (at 0.3 µm) to $R_q=14.77$ nm (at 2.1 µm). Roughness is proportional to the thickness of 2.2 T CoNiFe. Nevertheless, it has been determined that lumps are not formed even at 2.1 µm thickness. Likewise, it has been determined that the bilayer of 2.2 T CoNiFe and 1.8 T CoNiFe can be obtained as a smooth, lump-free film.

The present invention extends the capability of writer heads, particularly pulse width and over write (OVW) capabilities, for high areal density and high frequency applications. In particular, plated bilayer top poles (2.2 T CoNiFe+1.8 T CoNiFe) showed significant overwrite and pulse-width-at-50% (PW50) improvement. Successful demonstration of achieving high moment material by electrodeposition is very encouraging in terms of cost and overall ease of the process.

In summary, one embodiment of the present invention is directed to a magnetic head 310, 410, 510 having a non-magnetic writer gap layer 316, 416, 516 and a pair of magnetic poles 312, 318, 320, 412, 420, 422, 512, 520 separated by the writer gap layer 316, 416, 516. At least one of the poles 312, 322, 412, 424, 512, 520 includes a layer 318, 420, 520 composed of a CoNiFe alloy that has a saturation magnetic moment greater than 2.1 Tesla.

In one embodiment of the above-described magnetic head 310, 410, 510 the CoNiFe alloy has a saturation magnetic moment of about 2.1–2.3 Tesla.

In another embodiment of the above-described magnetic head 310, 410 the pole 312, 322, 412, 424 also has a second layer 320, 422 of CoNiFe alloy having a saturation magnetic moment greater than 1.8 Tesla. The second layer 320, 422 is disposed adjacent the first layer 318, 420 opposite the writer gap layer 316, 416.

Another embodiment of the present invention is directed to a method of forming a magnetic head 310, 410, 510. Pursuant to the method a substantially non-magnetic writer gap layer 316, 416, 516 is formed. A pair of magnetic poles 312, 322, 412, 424, 512, 520 is formed, one on each side of the writer gap layer 316, 416, 516. At least one of the poles 312, 322, 412, 424, 512, 520 includes a layer 318, 420, 520 comprising a CoNiFe alloy that has a saturation magnetic moment greater than 2.1 Tesla.

In one embodiment of the above method, the CoNiFe alloy has a saturation magnetic moment of about 2.1–2.3 Tesla.

In another embodiment of the above method, the pole 312, 322, 412, 424 also has a second layer 320, 422 of CoNiFe alloy having a saturation magnetic moment greater than 1.8 Tesla. The second layer 320, 422 is formed adjacent the first layer 318, 420 opposite the writer gap layer 316, 416.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic write head while maintaining substantially the same functionality without departing from the scope and spirit of the present invention. In addition, although the preferred embodiment described herein is directed to a magnetic write head for a disc drive system, it will be appreciated by those skilled in the art that the teachings of the present invention can be applied to other systems, like magnetic tape systems, without departing from the scope and spirit of the present invention.

What is claimed is:

1. A magnetic head comprising:
    a substantially non-magnetic writer gap layer; and
    a pair of magnetic poles separated by the writer gap layer,
        a first of the poles comprising a first layer including a CoNiFe alloy having a saturation magnetic moment greater than 2.1 Tesla.

2. The magnetic head of claim 1 wherein the first layer comprises a CoNiFe alloy having a saturation magnetic moment of less than or equal to about 2.3 Tesla.

3. The magnetic head of claim 1 wherein an atomic composition of the CoNiFe alloy is approximately 57–67% cobalt, approximately 0.5–4.0% nickel and approximately 24–42% iron.

4. The magnetic head of claim 1 wherein the first pole further comprises a second layer of CoNiFe alloy having a saturation magnetic moment greater than 1.8 Tesla, the second layer being disposed adjacent the first layer opposite the writer gap layer.

5. The magnetic head of claim 4 wherein an atomic composition of the second layer is approximately 63–75% cobalt, 11–19% nickel and approximately 14–19% iron.

6. The magnetic head of claim 4 wherein the first layer is disposed adjacent the writer gap layer.

7. The magnetic head of claim 4 further comprising a high magnetic moment sputtered seed layer having a saturation magnetic moment greater than 2.1 Tesla, positioned between the first layer and the writer gap layer and adjacent the first layer.

8. The magnetic head of claim 4 wherein the ratio of the thickness of the first layer to the thickness of the second layer is in a range of approximately 0.12–0.17.

9. The magnetic head of claim 1 wherein the first layer is disposed adjacent the writer gap layer.

10. The magnetic head of claim 1 further comprising a seed layer, comprised of a magnetic material, positioned between the first layer and the writer gap layer and adjacent the first layer.

11. The magnetic head of claim 1 wherein the substantially non-magnetic writer gap layer comprises sputtered alumina.

12. The magnetic head of claim 1 wherein the substantially non-magnetic writer gap layer comprises an electrodeposited alloy selected from the group consisting of PdNi, CuNi or NiP.

13. The magnetic head of claim 1 wherein the substantially non-magnetic writer gap layer comprises an electrodeposited alloy selected from the group consisting of PdNi wherein the atomic composition of Ni is approximately 10–15%, CuNi wherein the atomic composition of Cu is approximately 35–45% and NIP wherein the atomic composition of P is approximately 18–30%.

14. A magnetic head comprising:
    a substantially non-magnetic writer gap layer;
    a pair of magnetic poles separated by the writer gap layer,
        a first of the poles comprising:
            a first layer formed of 2.2 T CoNiFe;
            a second layer formed of a magnetic material having a saturation moment between 1.6 Tesla and 1.85 Tesla,
            wherein the first layer is disposed adjacent the writer gap layer and the second layer is disposed adjacent the first layer and opposite the writer gap layer.

15. The magnetic head of claim 14 wherein the second layer is formed of 1.8 T CoNiFe.

16. The magnetic head of claim 14 wherein the second layer is formed of 1.6 T NiFe.

17. The magnetic head of claim 14 wherein the ratio of the thickness of the first layer to the thickness of the second layer is in a range of approximately 0.12–0.17.

18. The magnetic head of claim 14 wherein the substantially non-magnetic writer gap layer comprises an electrodeposited alloy selected from the group consisting of PdNi, CuNi or NiP.

19. The magnetic head of claim 14 wherein the substantially non-magnetic writer gap layer comprises an electrodeposited alloy selected from the group consisting of PdNi wherein the atomic composition of Ni is approximately 10–15%, CuNi wherein the atomic composition of Cu is approximately 35–45% and NiP wherein the atomic composition of P is approximately 18–30%.

20. A magnetic head comprising:
   a substantially nonmagnetic writer gap layer adapted to be positioned proximate a magnetic medium; and
   means for producing a magnetic field in the magnetic medium proximate the writer gap layer.

* * * * *

UNITED STATES PATENT AND TRADEMARK OFFICE
CERTIFICATE OF CORRECTION

PATENT NO. : 6,778,357 B2
DATED : August 17, 2004
INVENTOR(S) : Tabakovic et al.

It is certified that error appears in the above-identified patent and that said Letters Patent is hereby corrected as shown below:

Title page,
Item [75], Inventors, change "Erik Hutchinson, Lakeville, MN (US);" to -- Erik Hutchinson, Apple Valley, MN (US); --.

Column 10,
Line 55, change "NIP" to -- NiP --.

Signed and Sealed this

Fifth Day of October, 2004

JON W. DUDAS
*Director of the United States Patent and Trademark Office*